(12) United States Patent
Black

(10) Patent No.: X2845
(45) Date of Patent: Oct. 3, 1817

(54) LAMPS

(76) Inventor: Alexander Black

Alexander Black

Sellers Patent

The schedule referred to in these Letters Patent and making part of the same containing a description in the words of the said Alex Black of his improvement in Lamps.

The Lamp is a common Argand Lamp for light houses and the wick is raised by a screw the same method of heating to be applied to any other kind of Lamps. For heating the oil a pipe, syphon, tube, hood inverted tunnel or cap of copper or other metal, square round, or any other figure that the heated air may be driven into around over or under the oil. One part of the hood or other conveyance is attached to the case of the fountain with a hole for the smoke and heat to enter, and the other part [illegible] attached to the fountain closely so that [illegible] will intervene the two edges of the case and fountain fit closely except two small holes near the union with the fountain for discharging the smoke which collects between them. When large reflectors are used a hole is cut through the reflector for placing the glass upon the lamp. Directly over this hole inside of the reflector a [illegible] is affixed to convey the smoke through behind the reflector when it operates on the pipe syphon tube hood inverted tunnel or cap in the same manner as with small reflectors. Also a solid rod or bar of metal will produce a sufficient effect for the same purpose by inserting a metal rod through the fountain of the lamp with its top part bent over the blaze of the lamp and made hollow like the hood or cap before mentioned, so that the blaze may operate on the inside of the cavity and heat the metal. At the bottom of the rod which extends through the fountain a large metal hollow may be soldered to retain the heat between the case and fountain. The hood or cap part of the rod may be one half of an inch more or less in the thickness, and the rod may be one inch in thickness more or less and either square, round or any other shape. The end of a rod may
be applied without [illegible] or cap over the blaze. the rod
may be of copper or any other metal, which will convey heat and is equal-
ly applicable to all Lamps to which it may be applied by insert-
ing in a cross bar inside the lamp to turn it to or from the
blaze. One convenience of the rod is, that its head may be placed
over the blaze in winter and turned from the blaze to the back
of the lamp in Summer. Around the outside case of the foun-
tain a woollen wrapper is wound or a stuffing of wool cotton or
some warm covering quilted or fastened to a leather, and
is made into a pocket to retain the heat if necessary
A [illegible] is also attached to the bottom of the tube of Argand's
lamp to draw off the oil by day that it may not chill and
prevent its burning by night.

For raising the wick. A sheave or band wheel is placed
around this hoop and the hoop when turned raises up the sock-
et or tube, which holds the wick.

For snuffing the lamp. A perpendicular wire passes through
the centre of the inside tube of the Argands Lamps with a
right angular finger which revolves over the wick and brush-
es off the snuff. This wire is preserved in a central position
by a hole thro a small cross bar near the top of the inside
tube and by a socket at the bottom of the crooked bar resem-
bling an L the upright part having a mortice through which
it is screwed against the outside of the lamp to adjust the height
of the finger for snuffing and the finger may be applied, like the
hand of a clock but is then a revolving [illegible]. A sheave or band
wheel is fastened at the bottom of this wire, by which it re-
ceives its rotation. The whistle or band wheel which turns the
hoop for raising the wick may be three inches diameter and may
also go by clockwork. And the wheel or band wheel which
moves the finger to brush off the coal or snuff may be one inch
diameter and moved by the same method as the band wheel.

for raising the wicks. The motion to these wheels is given by the bands which pass round the whirls or wheels of all the lamps and descend over the pulleys at the edge of the table and have balance weights at their ends to distend them.

The other end of these bands are fastened to two wires which descend to the lower part of the light house; And these two wires are fastened to sliders on the arm of a lever graduated like a Danish balance; that they may be moved farther towards the centre to increase the motion; or nearer to the fulcrum to lessen it.

The lever may be four or five feet in length or less the weight being suspended near one end and the wires attached to the sliders between that and the fulcrum or centre of motion. Other forms of levers can be applied. The weight is a buoyant vessel, floating ~~floating~~ in a liquid contained in another vessel, which has a cock, or aperture through which the liquid drops or runs. The best shape of these vessels is a frustrum of an inverted cone. The one which contains the liquid should have a strainer to prevent any obstruction ~~from~~ entering the cock and the buoyant one must be adjusted by weights sufficient to procure its gradual descent. Wheels and Pinions may be applied for the same purpose.

In order to carry off the smoke and vapour of the lamps from the lantern, a large inverted funnel may be suspended over the whole, with its pipe rising through the centre of the lantern. Upon the funnel, glass reflectors made to curve over the Lamps, so that the blaze from the lamps will run up them and have the appearance of double lamps. These reflectors are stationary and when the lamps are trimmed they are slid past them for the purpose and when trimmed replaced. The method of these improvements of Argand's lamps for light Houses is as follows. Place the lamps on the table and screw their feet firmly. Pass a band around the whirls or wheels for screwing up or raising the wicks and over the pulleys, at the edge of the table, attach one end of the bands to the wires, which extend from the
bottom of the light house. To the other end of the bands tie a
weight sufficiently heavy to distend the [illegible]. Pass another band
in a similar manner around the wheel, or wheel of the snuff
[illegible] and fasten one end to a wire and the other to a weight
as before described. Attach the lower ends of the two wires to
the sliders of the lever, and apply the buoyant weight to the end
of the lever. Then turn the cock till the percolation of the water
through the cock becomes nearly a stream. Observe how fast
the descent of the buoyant weight moves the wheels or wheels of
the feeder and snuffer and by moving the sliders on the lever,
adjust them correctly, should the motion of the lever not continue
a sufficient length of time either diminish the stream of the
liquid or remove the sliders of the lever nearer the buoyant
weight. The cock or aperture for the [illegible] has a [illegible] semi
circle [illegible] its [illegible] or handle to guage the exact sizes of the hole
for leaking. The liquid drops into a tub from which it
may be pumped, or dipped into its original container.
The following directions may be considered as requisite for executing
the machinery for the foregoing purpose. The cone for containing
the liquor may hold 130 gallons, more or less. The buoyant ves-
sel may be large enough to hold 25 or 30 gallons and to be
about one half loaded with weights. The liquid used for the
aforesaid purposes must be of such a nature as not to be con-
verted into ice by frost such as ardent spirits, pickle, or the
bitter water of salt works. I have also made the following im-
provement in the management of the light house. I white wash the
glass on the land side and give a proper inclination to the re-
flectors so as to throw the light higher and cast a better light
on the ocean. I have also invented a lamp for warming the hands
and feet of seamen whilst steering a vessel. I have made a tube
~~tube~~ or pipe of from two ? three or four inches in diameter [illegible] at
the lower end when placed in an aperture to be made in the deck of a vessel for warming it. I then make another tube or pipe
of copper, or any other metal, that will retain and conduct heat.
of from four to five feet in length, and of about 3 inches in di-
ameter; this tube or pipe is flattened so as to leave an aperture
from one eighth to one fourth of an inch and is made fast to
the deck of a vessel the centre immediately over and on an
aperture made in the deck; The small or narrowest end of the
first mentioned tube or pipe, is then inserted in this aperture, and
fastened or connected to the bottom or lower side of the flattened
tube or pipe fastened on the deck. The lamp is suspended in
the cabin, immediately and directly under the first mentioned
tube or pipe and made fast by wires attached to the lamp, near
the blaze and to the deck; and kept in that position, so that the
flame or blaze of the lamp will strike directly into the centre of
the mouth or open end of this tube, or pipe, so that the heat may
be conducted to the flattened tube or pipe fastened on the top
of the deck, and after [illegible] a metal plate or button and a rod
which are to be attached to the upper side of the flattened
tube or pipe on the deck. To the upper side of this flattened
tube or pipe is attached a metal plate or button about one or
two inches thick and three or four inches diameter. To this plate
or button is affixed or screwed in a rod which will receive the
heat from the lower tube or pipe, to which the man at the helm can
apply his hands when cold. his feet also may be warmed by
stepping on or applying them to the flattened tube or pipe
fastened to the deck. The ends of this tube are left open for
discharging the smoke. Felting placed between the deck and
flattened tube or pipe will prevent it from burning the deck.
The same principle can be applied to any house or Dwelling and
carriages of any kind. I also make a lamp for warming
the feet and giving light to a person travelling on horse back
or in a carriage in cold, dark weather. To do this I make
a case or slipper of copper sufficiently large to contain the feet.

and admit a small lamp in front of it with glass. This slipper which is made to fit, when put on, will cover a great part of the foot, and the heat from the blaze of the lamp striking against the slipper will communicate warmth to the foot whilst the light is reflected on the road. I also make a gas light lamp which furnishes itself with gas. I take a common Argand's lamp or any other lamp, or candle set fire in a place will answer the purpose. Let the blaze of the lamp or fire strike upon a vessel nearly half filled with pitch tar or rosin. From this vessel a tube may lead to any part of the House from whence a light will proceed when set fire to. This blaze may also strike against another vessel half filled in the same manner with pitch &c and a pipe leading from it will give another light and so on to any number of lights. I have also erected a model of a floating bell to be placed on dangerous ledges and shoals for the preservation of the lives of Seamen and Property.

Exd. Witnesses
M.G.C. J. M. Varnum } Alexander Black
Mary P. Varnum }